(12) United States Patent
Cheng

(10) Patent No.: US 10,972,010 B2
(45) Date of Patent: Apr. 6, 2021

(54) CONTROLLER AND CONTROL METHOD USED IN SWITCHED TANK CONVERTER

(71) Applicant: Chengdu Monolithic Power Systems Co., Ltd., Chengdu (CN)

(72) Inventor: Hao-Chien Cheng, New Taipei (TW)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 16/695,101

(22) Filed: Nov. 25, 2019

(65) Prior Publication Data
US 2020/0186039 A1 Jun. 11, 2020

(30) Foreign Application Priority Data
Dec. 5, 2018 (CN) .......................... 201811485337.0

(51) Int. Cl.
| H02M 3/07 | (2006.01) |
| H02M 1/00 | (2006.01) |
| H02M 3/158 | (2006.01) |
| H02M 1/08 | (2006.01) |
| H02M 3/335 | (2006.01) |

(52) U.S. Cl.
CPC ......... H02M 3/1588 (2013.01); H02M 1/083 (2013.01); H02M 3/073 (2013.01); H02M 3/33569 (2013.01); H02M 2001/0009 (2013.01); H02M 2001/0058 (2013.01); H02M 2003/077 (2013.01)

(58) Field of Classification Search
CPC ........ H02M 3/07; H02M 3/073; H02M 3/077; H02M 2001/0058; H02M 2001/0009
See application file for complete search history.

(56) References Cited

U.S. PATENT DOCUMENTS

| 8,817,501 | B1 * | 8/2014 | Low | H02M 3/07 363/60 |
| 9,917,517 | B1 * | 3/2018 | Jiang | H02M 3/335 |
| 10,122,256 | B1 * | 11/2018 | Babazadeh | H02M 7/219 |
| 10,224,803 | B1 * | 3/2019 | Rainer | H02M 3/158 |
| 10,256,729 | B1 * | 4/2019 | Notsch | H02M 3/1588 |
| 10,439,493 | B1 * | 10/2019 | Zafarana | H02M 3/156 |
| 10,608,530 | B1 * | 3/2020 | Zhu | H02M 3/07 |
| 10,651,731 | B1 * | 5/2020 | Rainer | H02M 1/15 |
| 10,778,098 | B2 * | 9/2020 | Yang | H02M 3/07 |

(Continued)

*Primary Examiner* — Thienvu V Tran
*Assistant Examiner* — Sisay G Tiku
(74) *Attorney, Agent, or Firm* — Perkins Coie LLP

(57) ABSTRACT

A control method used in a switched tank converter with a first conversion unit, a second conversion unit and a rectification unit, includes: based on current flowing through the resonant tanks in the first and second conversion units, determining when to turn on the high side switches of the first and second conversion units, and when to turn on the low side switches of the first and second conversion units; detecting whether current flowing through the first, second, third and fourth rectification switches crosses zero; and based on the detection result, respectively determining when to turn off the high side switch of the first conversion unit, when to turn off the high side switch of the second conversion unit, when to turn off the low side switch of the second conversion unit, and when to turn off the low side switch of the first conversion unit.

16 Claims, 13 Drawing Sheets

(56) References Cited

U.S. PATENT DOCUMENTS

| | | | |
|---|---|---|---|
| 2015/0015225 A1* | 1/2015 | Cheng | H02M 3/1584 |
| | | | 323/282 |
| 2019/0334434 A1* | 10/2019 | Jong | H02M 3/073 |
| 2020/0186028 A1* | 6/2020 | Cheng | H02M 3/335 |
| 2020/0220468 A1* | 7/2020 | Rainer | H02M 3/07 |

* cited by examiner

CONTROLLER AND CONTROL METHOD USED IN SWITCHED TANK CONVERTER

CROSS-REFERENCE TO RELATED APPLICATIONS

This application claims the benefit of Chinese application 201811485337.0, filed on Dec. 5, 2018, and incorporated herein by reference.

TECHNICAL FIELD

The present invention generally relates to electronic circuits, and more particularly but not exclusively, to switched tank converters and control methods thereof.

BACKGROUND

Compared with traditional switched capacitor converters, switched tank converters work in a resonant state, so there is no current spike. This makes switched tank converters suitable for applications with large output current. As shown in FIGS. 1A and 1B, conventional switched tank converters are usually controlled by control signals with 50% duty cycle. To achieve zero current switching, frequency of the control signals is typically set to be equal to resonant frequency of resonant circuits in the converter. However, since equivalent circuits of the resonant circuits in different paths or different time period are different, and resonant elements contained therein have inherent manufacture deviation, it is difficult to realize zero current switching for all the switches. A commonly used solution is to set capacitance of the capacitor C22 to be much higher than that of the capacitors C1 and C2, so as to reduce the resonance frequency difference between different resonant circuits. However, this will undoubtedly increase the volume of the resonant tank converter.

SUMMARY

Embodiments of the present invention are directed to a control method used in a switched tank converter, wherein the switched tank converter comprises a first conversion unit, a second conversion unit and a rectification unit. Each of the conversion units has a first terminal, a second terminal, a third terminal, a fourth terminal and a switch node, and includes a clamp capacitor coupled between the first and third terminals, a high side switch coupled between the first terminal and the switch node, a low side switch coupled between the switch node and the second terminal, and a resonant tank coupled between the switch node and the fourth terminal. The first terminal of the second conversion unit is coupled to the second terminal of the first conversion unit. The rectification unit includes a first rectification switch, a second rectification switch, a third rectification switch and a fourth rectification switch. Each of the rectification switches has a first terminal and a second terminal. The first terminals of the first and fourth rectification switches are coupled to the second terminal of the second conversion unit, the second terminals of the second and third rectification switches are coupled together, the second terminal of the first rectification switch and the first terminal of the third rectification switch are coupled to the fourth terminals of the first and second conversion units, the second terminal of the fourth rectification switch and the first terminal of the second rectification switch are coupled to the third terminal of the second conversion unit. The control method comprises: based on current flowing through the resonant tanks in the first and second conversion units, determining when to turn on the high side switches of the first and second conversion units, and when to turn on the low side switches of the first and second conversion units; detecting whether current flowing through the first, second, third and fourth rectification switches crosses zero; and based on the detection result, respectively determining when to turn off the high side switch of the first conversion unit, when to turn off the high side switch of the second conversion unit, when to turn off the low side switch of the second conversion unit, and when to turn off the low side switch of the first conversion unit.

Embodiments of the present invention are also directed to a controller used in a switched tank converter, wherein based on current flowing through the resonant tanks in the first and second conversion units, the controller determines when to turn on the high side switches of the first and second conversion units, and when to turn on the low side switches of the first and second conversion units. The controller further detects whether current flowing through the first, second, third and fourth rectification switches crosses zero. And based on the detection result, the controller respectively determines when to turn off the high side switch of the first conversion unit, when to turn off the high side switch of the second conversion unit, when to turn off the low side switch of the second conversion unit, and when to turn off the low side switch of the first conversion unit.

Embodiments of the present invention are further directed to a switched tank converter comprising: a first conversion unit and a second conversion unit, wherein each of the conversion units has a first terminal, a second terminal, a third terminal, a fourth terminal and a switch node, and includes a clamp capacitor coupled between the first and third terminals, a high side switch coupled between the first terminal and the switch node, a low side switch coupled between the switch node and the second terminal, and a resonant tank coupled between the switch node and the fourth terminal, and wherein the first terminal of the second conversion unit is coupled to the second terminal of the first conversion unit; a rectification unit including a first rectification switch, a second rectification switch, a third rectification switch and a fourth rectification switch, wherein each of the rectification switches has a first terminal and a second terminal, and wherein the first terminals of the first and fourth rectification switches are coupled to the second terminal of the second conversion unit, the second terminals of the second and third rectification switches are coupled together, the second terminal of the first rectification switch and the first terminal of the third rectification switch are coupled to the fourth terminals of the first and second conversion units, the second terminal of the fourth rectification switch and the first terminal of the second rectification switch are coupled to the third terminal of the second conversion unit; and a controller configured to control the high side and low side switches of the first and second conversion units, wherein based on current flowing through the resonant tanks in the first and second conversion units, the controller determines when to turn on the high side switches of the first and second conversion units, and when to turn on the low side switches of the first and second conversion units. The controller further detects whether current flowing through the first, second, third and fourth rectification switches crosses zero. And based on the detection result, the controller respectively determines when to turn off the high side switch of the first conversion unit, when to turn off the high side switch of the second conversion unit, when to turn off the low side switch of the second conversion unit, and when to turn off the low side switch of the first conversion unit.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

Figure 1A:
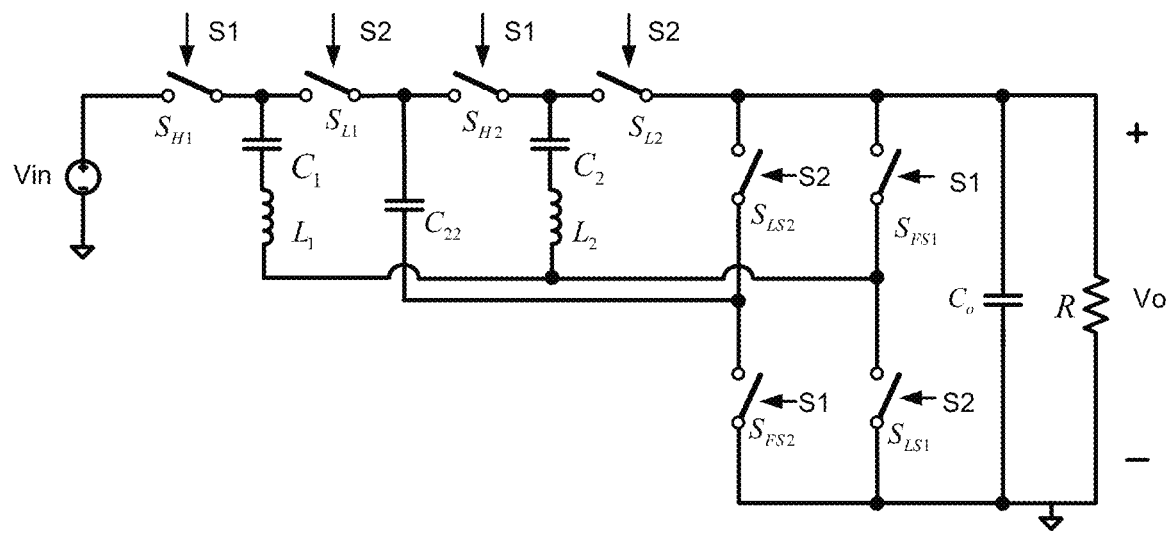
FIGS. 1A and 1B are schematic diagram and waveforms of a conventional switched tank converter.
Figure 1B:
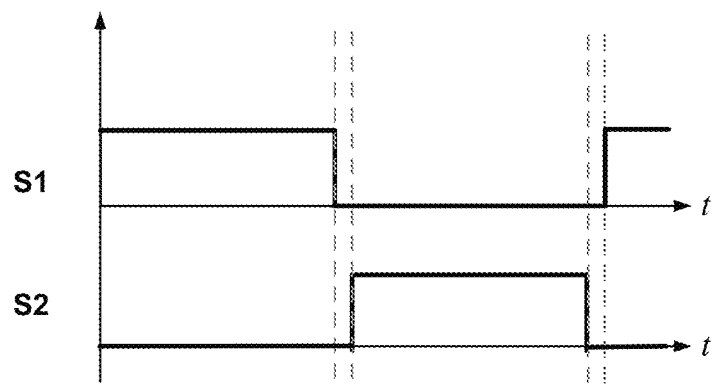
Figure 2A:
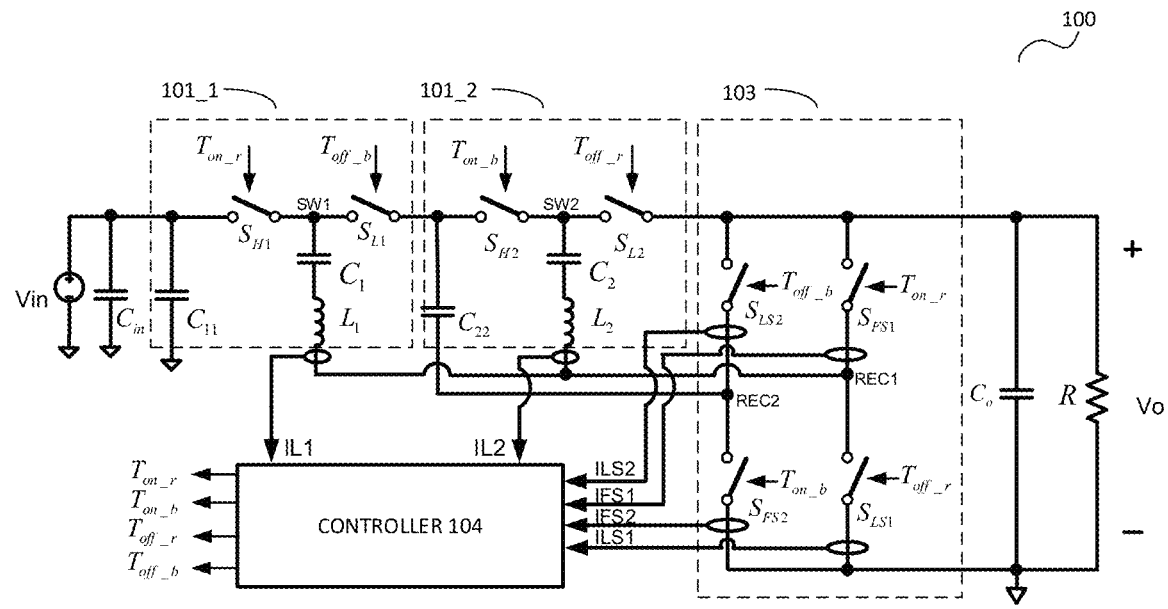
FIG. 2A is a block diagram of a switched tank converter 100 in accordance with an embodiment of the present invention.

FIG. 2A schematically illustrates a switched tank converter 100 in accordance with an embodiment of the present invention. It includes an input capacitor Cin, a first conversion unit 101_1, a second conversion unit 101_2, a rectification unit 103, an output capacitor Co and a controller 104. The input capacitor Cin is coupled between an input voltage Vin and a reference ground. The output capacitor Co is connected to a load R in parallel, and is coupled between an output voltage Vo and the reference ground. The conversion units 101_1 and 101_2 have substantially same internal structures. As can be seen from FIG. 2B, each of the conversion units has a first terminal, a second terminal, a third terminal, a fourth terminal and a switch node, and each includes a clamp capacitor coupled between the first terminal and the third terminal, a high side switch coupled between the first terminal and the switch node, a low side switch coupled between the switch node and the second terminal, and a resonant tank coupled between the switch node and the fourth terminal. Specifically, as shown in FIG. 2A, the first conversion unit 101_1 includes a first clamp capacitor C11, a first high side switch SH1, a first low side switch SL1, and a first resonant tank. The second conversion unit 101_2 includes a second clamp capacitor C22, a second high side switch SH2, a second low side switch SL2, and a second resonant tank. The first terminal of the first conversion unit 101_1 is coupled to the input voltage Vin, the first terminal of the second conversion unit 101_2 is coupled to the second terminal of the first conversion unit 101_1, and the second terminal of the second conversion unit 101_2 is coupled to the output voltage Vo.

In the embodiment shown in FIG. 2A, the first resonant tank includes a first resonant capacitor C1 and a first resonant inductor L1 connected in series, and the second resonant tank includes a second resonant capacitor C2 and a second resonant inductor L2 connected in series. However, those of ordinary skills in the art can understand that, the resonant tank could also adopt other resonant structures, without departing from the spirit of the present invention.

The rectification unit 103 includes rectification switches SFS1, SFS2, SLS1 and SLS2. wherein each of the rectification switches has a first terminal and a second terminal. The first terminals of SFS1 and SLS2 are coupled to the second terminal of the second conversion unit 101_2, the second terminals of SFS2 and SLS1 are coupled to the reference ground. The second terminal of SFS1 and the first terminal of SLS1 are coupled together to form a first rectification node REC1, and are coupled to the fourth terminals of the conversion units 101_1 and 101_2. The second terminal of SLS2 and the first terminal of SFS2 are coupled together to form a second rectification node REC2, and are coupled to the third terminal of the second conversion unit 101_2. The third terminal of the first conversion unit 101_1 is coupled to the reference ground.

Based on current IL1 flowing through the first resonant tank, current IL2 flowing through the second resonant tank, and current IFS1, IFS2, ILS1, and ILS2 respectively flowing through the rectification switches, the controller 104 generates control signals Ton_r, Ton_b, Toff_r, and Toff_b. Ton_r is used to control the switches SH1 and SFS1, Ton_b is used to control the switches SH2 and SFS2, Toff_r is used to control the switches SL2 and SLS1, Toff_b is used to control the switches SL1 and SLS2. To be more specific, the controller 104 determines when to turn on switches SH1, SL2, SFS1 and SFS2, and when to turn on the switches SL1, SH2, SLS1 and SLS2, in accordance with the current IL1 and IL2. For example, the controller 104 could detect whether the current IL1 and IL2 are equal, or detect whether the current IL1 and IL2 have both finished zero cross, so as to determine when to turn on the aforementioned switches.

The controller 104 further detects whether the current IFS1, IFS2, ILS1, and ILS2 cross zero. Based on the zero cross detection result, the controller 104 respectively determines when to turn off the switches SH1 and SFS1, when to turn off the switches SH2 and SFS2, when to turn off the switches SL2 and SLS1, and when to turn off the switches SL1 and SLS2.

Generally speaking, when a current changes its direction, e.g., from a positive value into a negative value, or from a negative value into a positive value, the current is deemed as crossing zero. The current could be compared with a threshold, which may be equal to or around zero, to detect whether there is a zero cross. For instance, the current could be compared with a threshold slightly higher than zero, where a zero cross of the current might be detected when the current changes from higher than the threshold into lower than the threshold, and vice versa.

Figure 3:
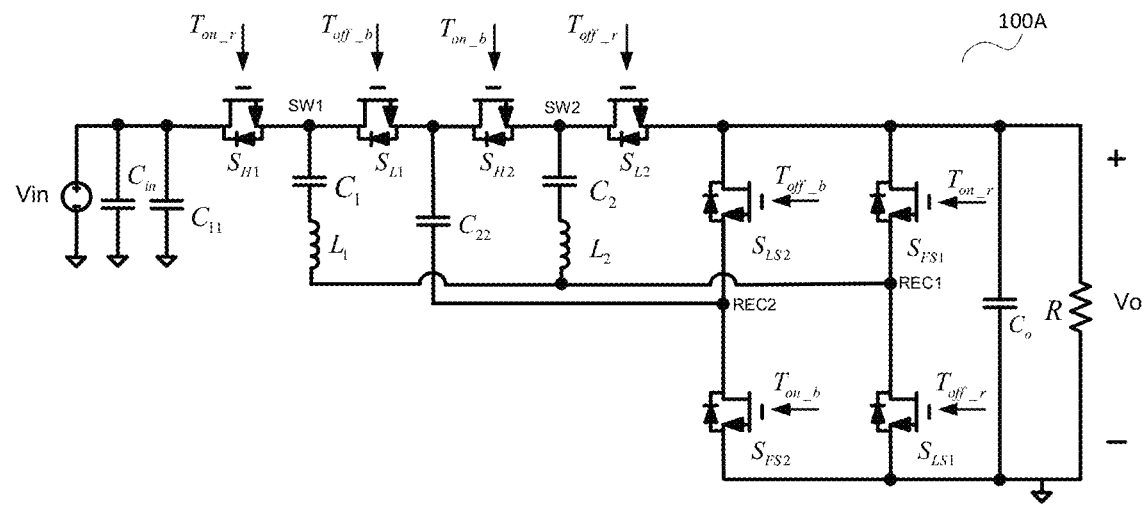
FIG. 3 schematically illustrates a switched tank converter 100A in accordance with an embodiment of the present invention.

The switches in the converter 100 could be any controllable semiconductor devices, such as metal oxide semiconductor field effect transistors (MOSFETs) shown in FIG. 3.

Figure 4A:
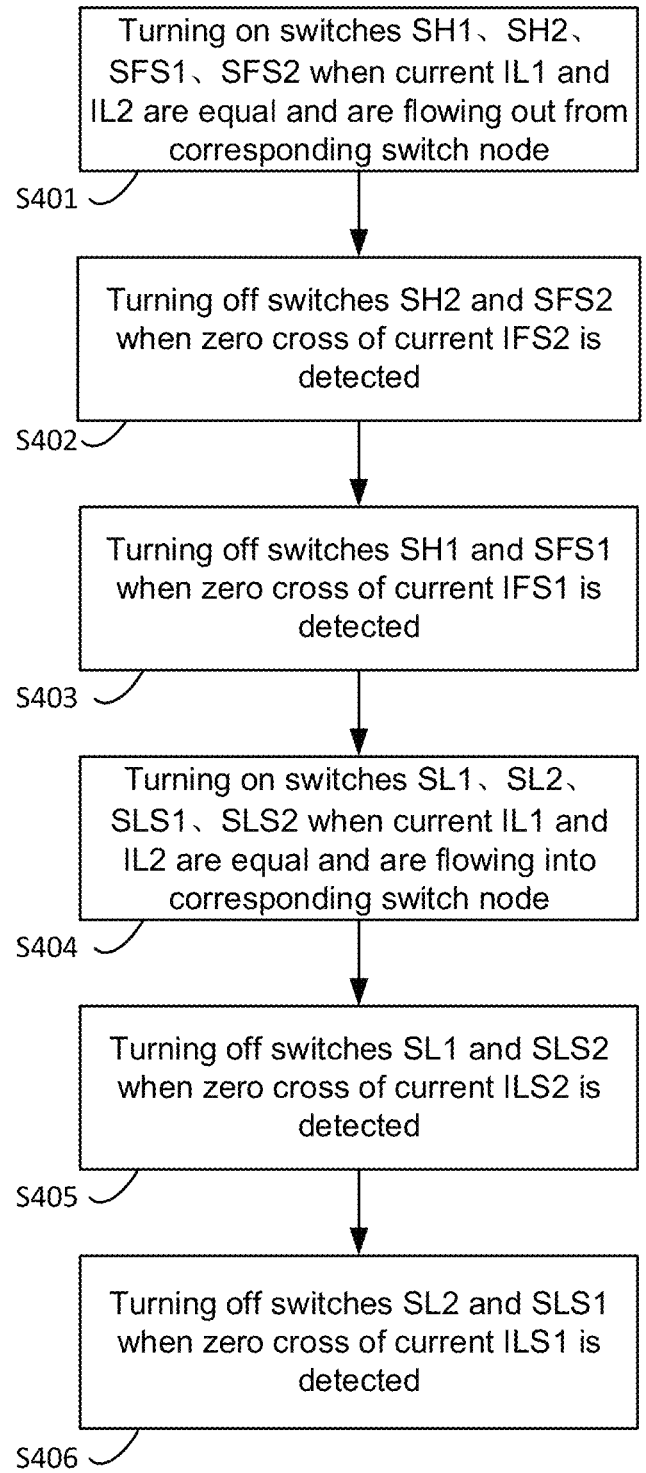
FIG. 4A is a flow chart of a control method used in switched tank converters, in accordance with an embodiment of the present invention.

FIG. 4A is a flow chart of a control method used in switched tank converters, in accordance with an embodiment of the present invention. It includes steps S401-S406.

Step S401: turning on the switches SH1, SH2, SFS1 and SFS2, when it is detected that the current IL1 and IL2 both flow out from the corresponding switch node (SW1, SW2) and are equal to each other.

Step S402: turning off the switches SH2, SFS2, when a zero cross of the current IFS2 flowing through the switch SFS2 is detected.

Step S403: turning off the switches SH1 and SFS1, when a zero cross of the current IFS1 flowing through the switch SFS1 is detected.

Step S404: turning on the switches SL1, SL2, SLS1 and SLS2, when it is detected that the current IL1 and IL2 both flow into the corresponding switch node and are equal to each other.

Step S405: turning off the switches SL1 and SLS2, when a zero cross of the current ILS2 flowing through the switch SLS2 is detected.

Step S406: turning off the switches SL2 and SLS1, when a zero cross of the current ILS1 flowing through the switch SLS1 is detected.

Figure 4B:
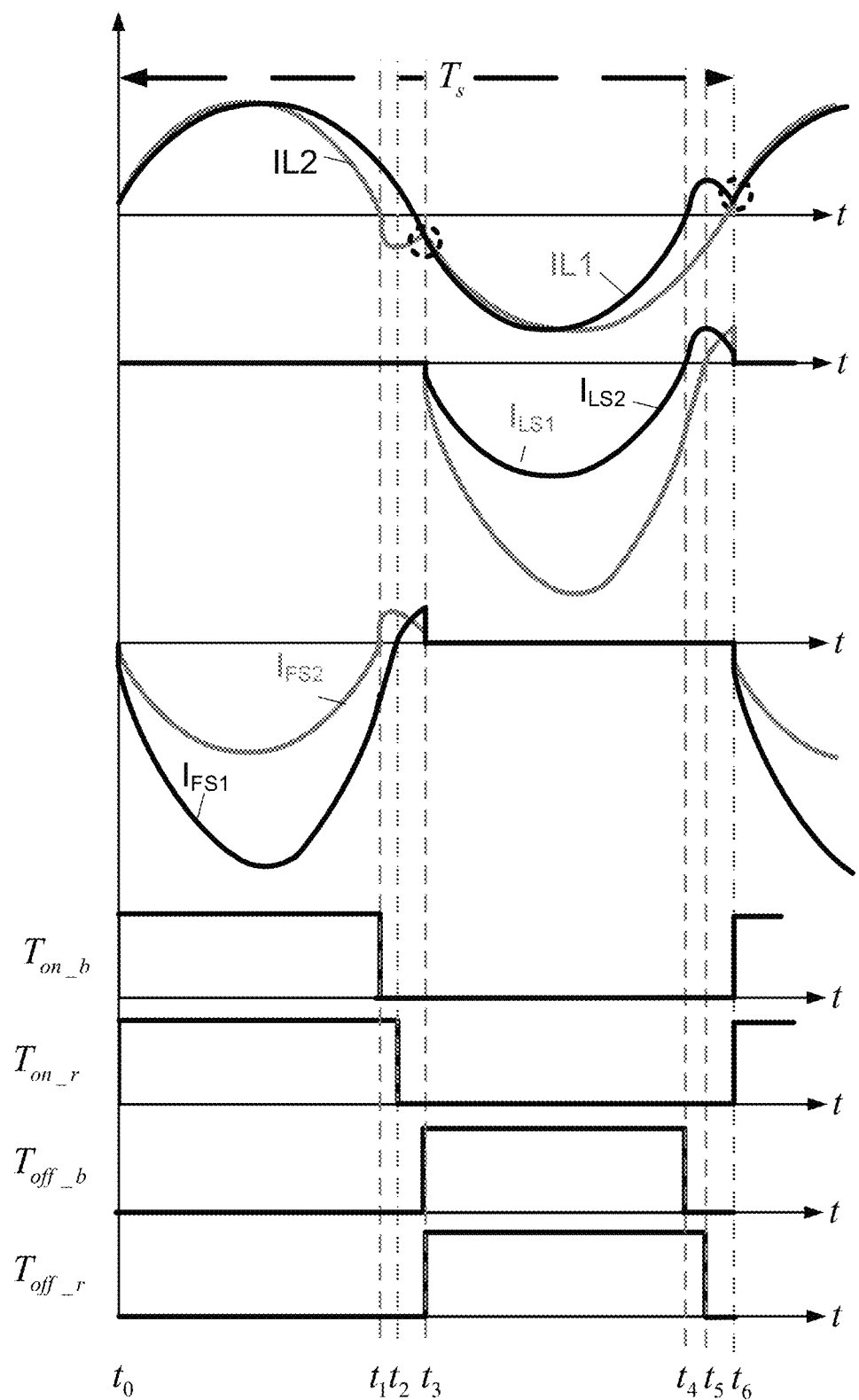
FIG. 4B illustrates waveforms of the switched tank converter 100A under the control method of FIG. 4A, in accordance with an embodiment of the present invention.

Working principle of the switched tank converter will be further described below with reference to FIG. 4B and FIG. 5A-5F. FIG. 4B illustrates waveforms of the switched tank converter 100A under the control method of FIG. 4A, FIG. 5A-5F are schematic diagrams of the switched tank converter 100A during different time period.

Figure 5A:
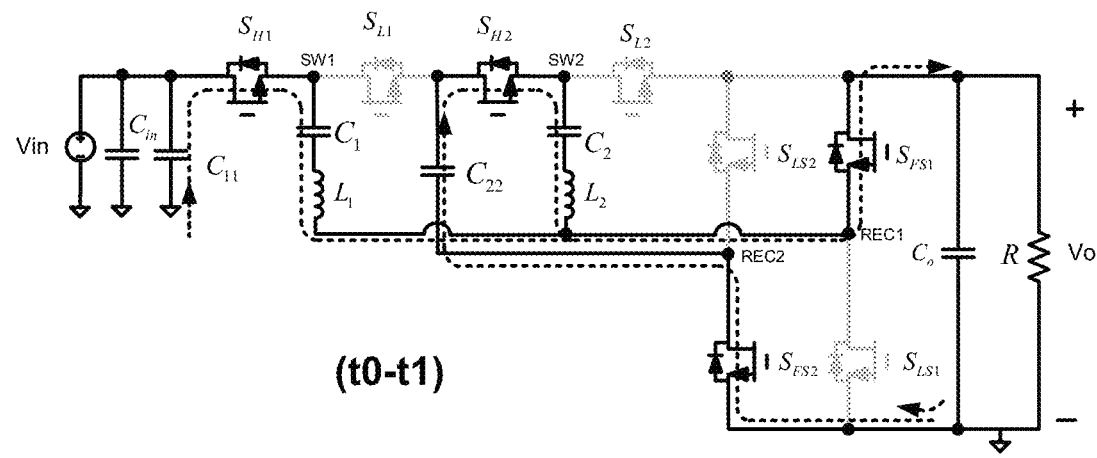
FIG. 5A-5F illustrate schematic diagrams of the switched tank converter 100A under the control method of FIG. 4A, in accordance with an embodiment of the present invention.
Figure 5B:
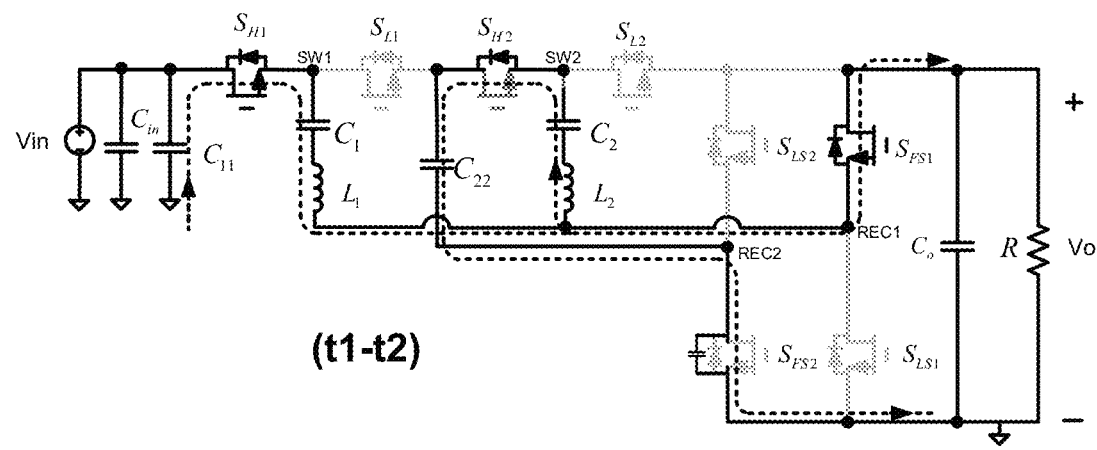
Figure 5C:
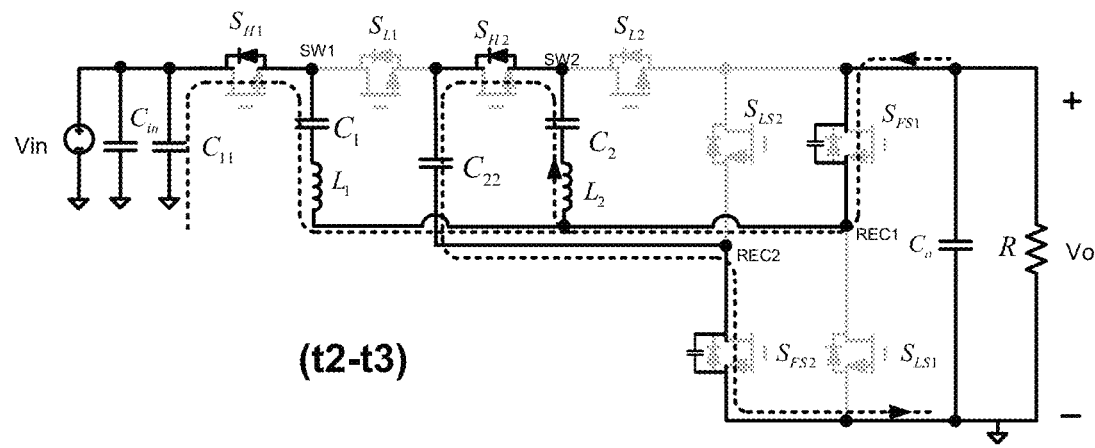

During t0-t1, the control signals Ton_b and Ton_r are logical high, Toff_b and Toff_r are logical low, the switches SH1, SH2, SFS1 and SFS2 are turned on, and the switches SL1, SL2, SLS1 and SLS2 are turned off. Equivalent circuit of the converter is shown in FIG. 5A. Energy stored in the capacitor C11 is discharged to the capacitors C1 and Co, and resonant frequency of the path could be expressed as:

$$F_{RS\_ton\_r} = \frac{1}{2\pi\sqrt{L_1[(C_{in}+C_{11})//C_1//C_o]}}$$

Energy stored in the capacitor C22 is discharged to the capacitors C2 and Co, and resonant frequency of the path could be expressed as:

$$F_{RS\_ton\_b} = \frac{1}{2\pi\sqrt{L_2(C_{22}//C_2//C_o)}}$$

At t1, a zero cross of the current IFS2 flowing through the switch SFS2 is detected. The control signal Ton_b is changed into logical low, and the switches SH2 and SFS2 are turned off. During the subsequent time period until t3, the current IL2 flows through a body diode of the switch SH2, and its resonant frequency is primarily determined by the drain-source capacitance of the switch SFS2.

At t2, a zero cross of the current IFS1 flowing through the switch SFS1 is detected, the control signal Ton_r is changed into logical low, and the switches SH1 and SFS1 are turned off. Subsequently, the current IL1 completes its commutation during the time period t2-t3.

At t3, the current IL1 and IL2 are detected to be equal to each other. The control signals Toff_b and Toff_r are changed into logical high, and the switches SL1, SL2, SLS1 and SLS2 are turned on. At this moment, the current IL1 and IL2 have the same direction, they both flow from the rectification node REC1 into the corresponding switch node. During t043, the current IFS1 is equal to a sum of the current IL1 and IL2, and the current IFS2 is equal to the current IL2.

Figure 5D:
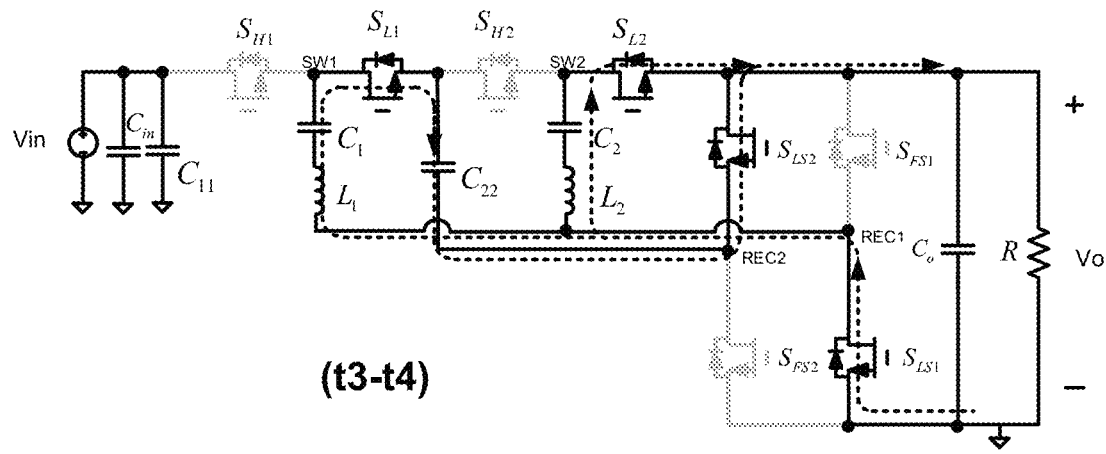
Figure 5E:
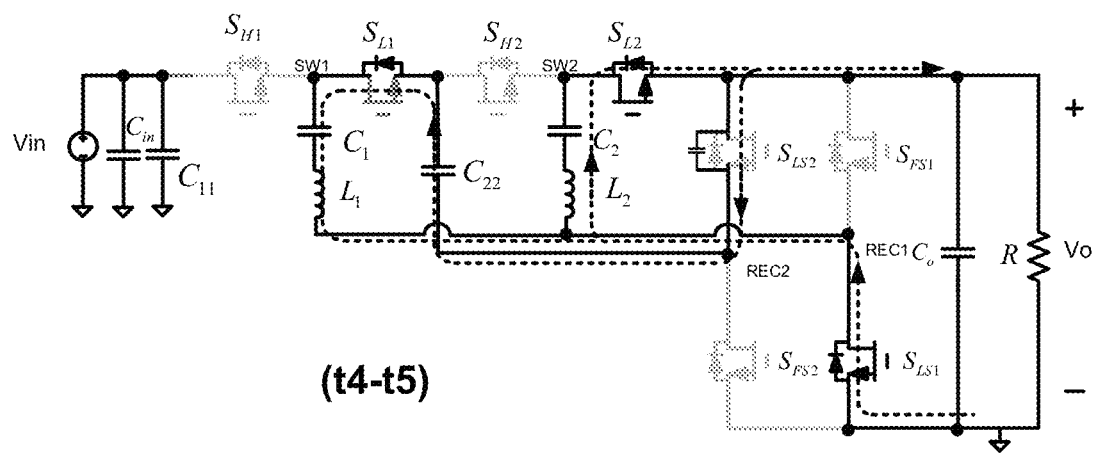
Figure 5F:
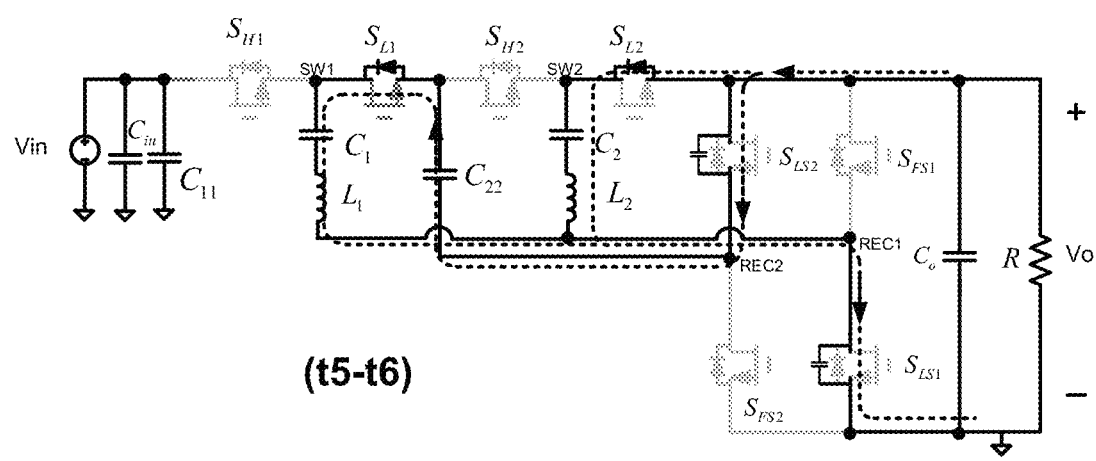

During t3-t4, the switches SH1, SH2, SFS1 and SFS2 are off, and the switches SL1, SL2, SLS1, and SLS2 are on. Equivalent circuit of the converter is shown in FIG. 5D. Energy stored in the capacitor C1 is discharged to the capacitors C22 and Co, and resonant frequency of the path could be expressed as:

$$F_{RS\_toff\_b} = \frac{1}{2\pi\sqrt{L_2(C_{22}//C_1//C_o)}}$$

Energy stored in the capacitor C2 is discharged to the capacitor Co, and resonant frequency of the path could be expressed as:

$$F_{RS\_toff\_r} = \frac{1}{2\pi\sqrt{L_2(C_2//C_o)}}$$

At t4, a zero cross of the current ILS2 flowing through the switch SLS2 is detected. The control signal Toff_b is changed into logical low, and the switches SL1 and SLS2 are turned off. During the subsequent time period until t6, the current IL1 flows through the body diode of the switch SL1, and its resonant frequency is primarily determined by the drain-source capacitance of the switch SLS2.

At t5, a zero cross of the current ILS1 flowing through the switch SLS1 is detected. The control signal Toff_r is changed into logical low, and the switches SL2 and SLS1 are turned off. Subsequently, the current IL2 completes its commutation during the time period t5-t6.

At t6, the current IL1 and IL2 are detected to be equal to each other, and the control signals Ton_b and Ton_r are changed into logical high. The switches SH1, SH2, SFS1 and SFS2 are turned on, and the converter enters into a next switching cycle. The current IL1 and IL2 have the same direction at t6, they both flow out from the corresponding switch node into the rectification node REC1. During t3-t6, the current ILS1 is equal to a sum of the currents IL1 and IL2, and the current ILS2 is equal to the current IL1.

Figure 6A:
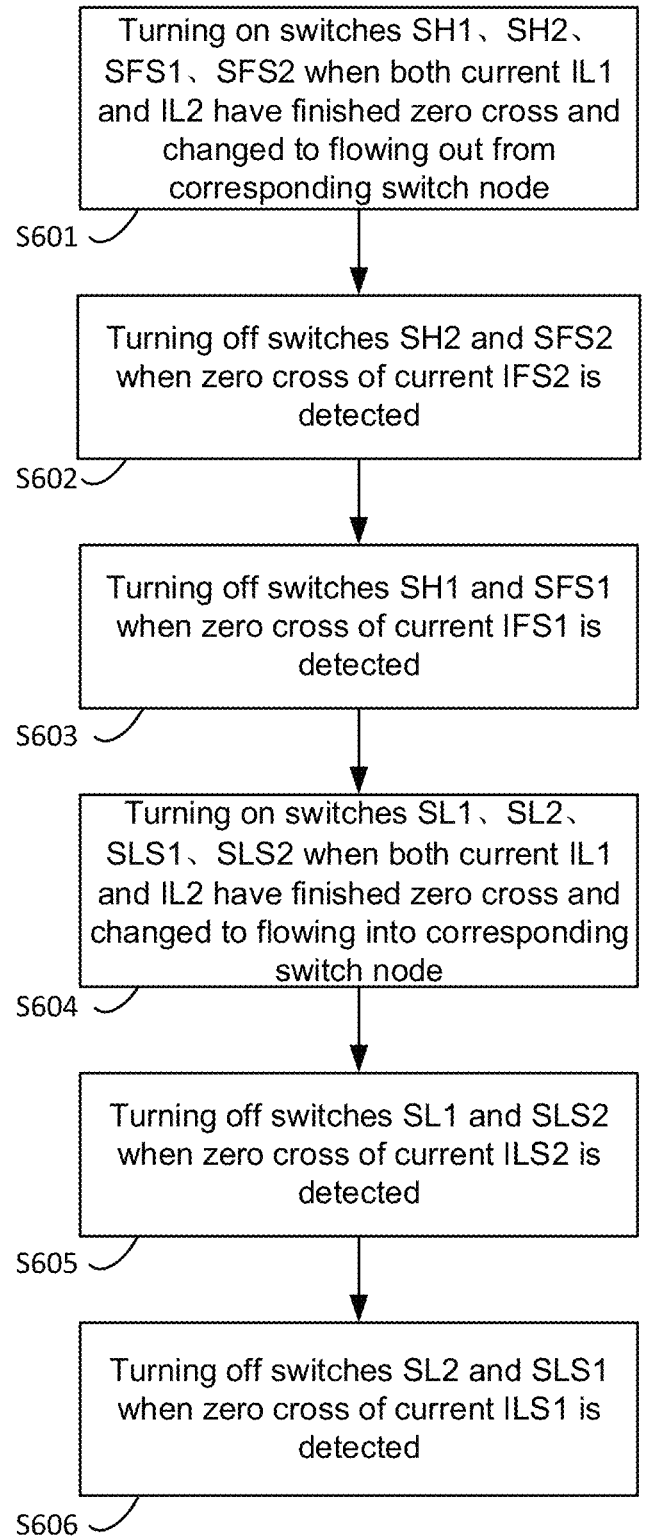
FIG. 6A is a flow chart of a control method used in switched tank converters, in accordance with another embodiment of the present invention.

FIG. 6A is a flow chart of a control method used in switched tank converters, in accordance with another embodiment of the present invention. It includes steps S601-S606.

Step S601: turning on the switches SH1, SH2, SFS1 and SFS2, when it is detected that both the current IL1 and IL2 have finished their zero cross and changed their direction to flowing out from the corresponding switch node.

Step S602: turning off the switches SH2, SFS2, when a zero cross of the current IFS2 flowing through the switch SFS2 is detected.

Step S603: turning off the switches SH1 and SFS1, when a zero cross of the current IFS1 flowing through the switch SFS1 is detected.

Step S604: turning on the switches SL1, SL2, SLS1 and SLS2, when it is detected that both the current IL1 and IL2 have finished their zero cross and changed their direction to flowing into the corresponding switch node.

Step S605: turning off the switches SL1 and SLS2, when a zero cross of the current ILS2 flowing through the switch SLS2 is detected.

Step S606: turning off the switches SL2 and SLS1, when a zero cross of the current ILS1 flowing through the switch SLS1 is detected.

Figure 6B:
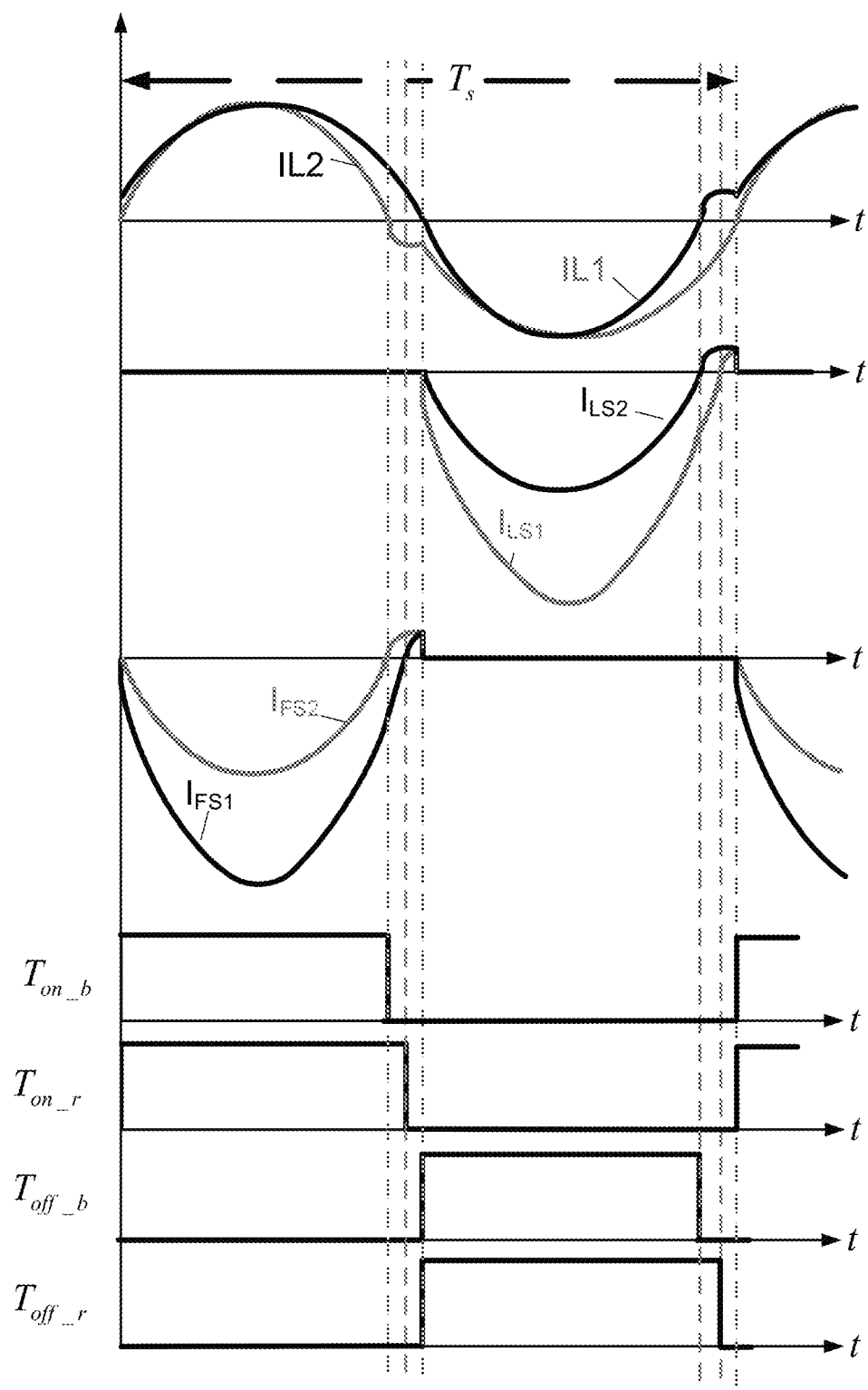
FIG. 6B illustrates waveforms of the switched tank converter 100A under the control method of FIG. 6A, in accordance with an embodiment of the present invention.

FIG. 6B illustrates waveforms of the switched tank converter 100A under the control method of FIG. 6A. As can be seen from FIG. 6B, the time point when the switches are turned on are in fact determined by the one with latter zero cross among the current IL1 and IL2.

Figure 7:
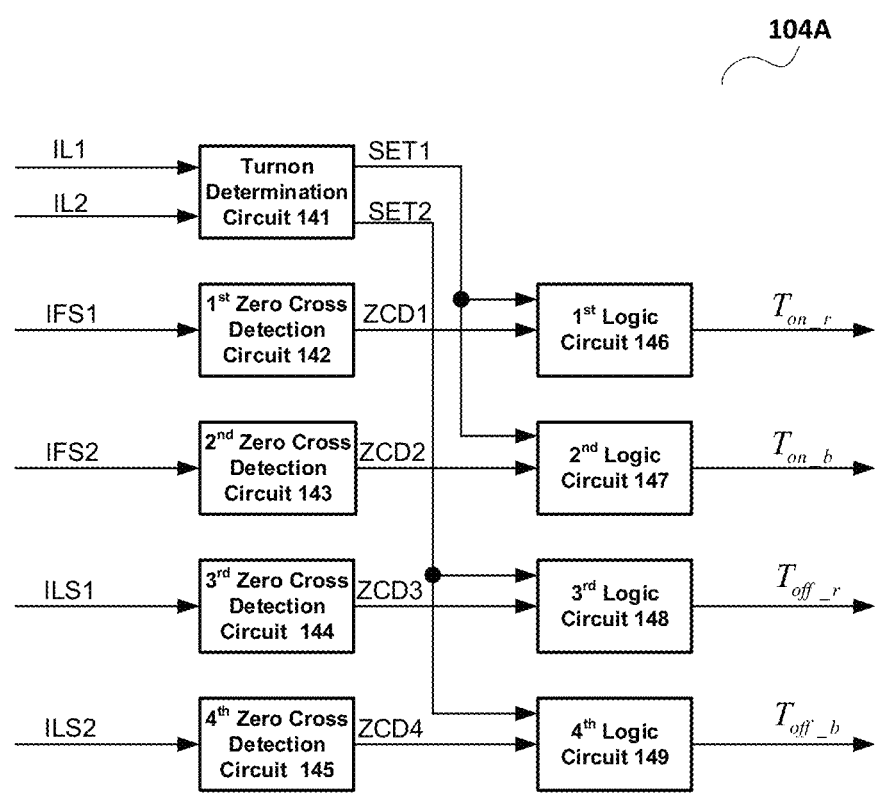
FIG. 7 is a block diagram of a controller 104A in accordance with an embodiment of the present invention.

FIG. 7 is a block diagram of a controller 104A in accordance with an embodiment of the present invention. It includes a turnon determination circuit 141, a first zero cross detection circuit 142, a second zero cross detection circuit 143, and a third zero cross detection circuit 144, a fourth zero cross detection circuit 145, a first logic circuit 146, a second logic circuit 147, a third logic circuit 148, and a fourth logic circuit 149. The turnon determination circuit 141 detects the current IL1 and IL2, and generates a first turnon control signal SET1 and a second turnon control signal SET2 based thereupon. The turnon determination circuit 141 could detect whether the IL1 and IL2 are equal, or detect whether IL1 and IL2 have both finished zero cross, and subsequently generate the turnon control signals SET1 and SET2 based on the detection result and also the direction of IL1 and IL2.

The first zero cross detection circuit 142 detects whether the current IFS1 flowing through the switch SFS1 crosses zero and generates a first zero cross detection signal ZCD1. The second zero cross detection circuit 143 detects whether the current IFS2 flowing through the switch SFS2 crosses zero and generates a second zero cross detection signal ZCD2. The third zero cross detection circuit 144 detects whether the current ILS1 flowing through the switch SLS1 crosses zero and generates a third zero cross detection signal ZCD3. The fourth zero cross detection circuit 145 detects whether the current ILS2 flowing through the switch SLS2 crosses zero and generates a fourth zero cross detection signal ZCD4. In some practical applications, the abovementioned detection or determination circuits could sample the corresponding current (for example, through sensing resistors or current transformers, etc.), and conduct comparison operation based on the sampled signals to realize the corresponding function.

The first logic circuit 146 is coupled to the turnon determination circuit 141 and the first zero cross detection circuit 142, and generates a control signal Ton_r to control the switches SH1 and SFS1 based on the first turnon control signal SET1 and first zero cross detection signal ZCD1. The second logic circuit 147 is coupled to the turnon determination circuit 141 and the second zero cross detection circuit 143, and generates a control signal Ton_b to control the switches SH2 and SFS2 based on the first turnon control signal SET1 and second zero cross detection signal ZCD2. The third logic circuit 148 is coupled to the turnon determination circuit 141 and the third zero cross detection circuit 144, and generates a control signal Toff_r to control the switches SL2 and SLS1 based on the second turnon control signal SET2 and the third zero cross detection signal ZCD3. The fourth logic circuit 149 is coupled to the turnon determination circuit 141 and the fourth zero cross detection circuit 145, and generates a control signal Toff_b to control the switches SL1 and SLS2 based on the second turnon control signal SET2 and the fourth zero cross detection signal ZCD4.

Figure 2B:
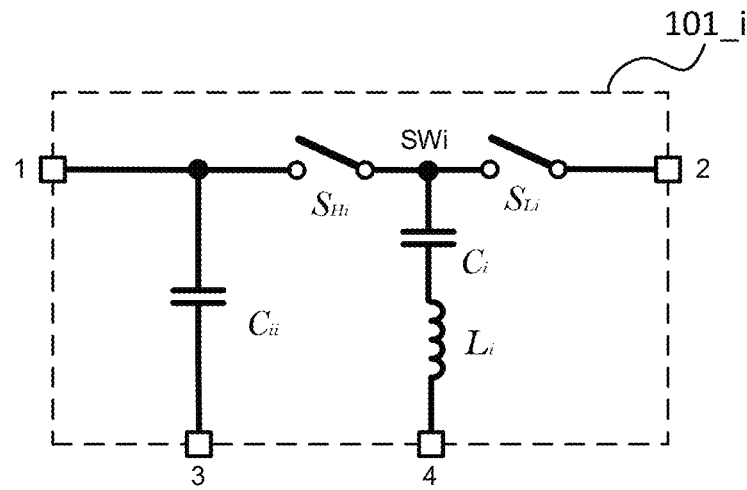
FIG. 2B schematically illustrates a conversion unit in the switched tank converter 100, in accordance with an embodiment of the present invention.
Figure 8:
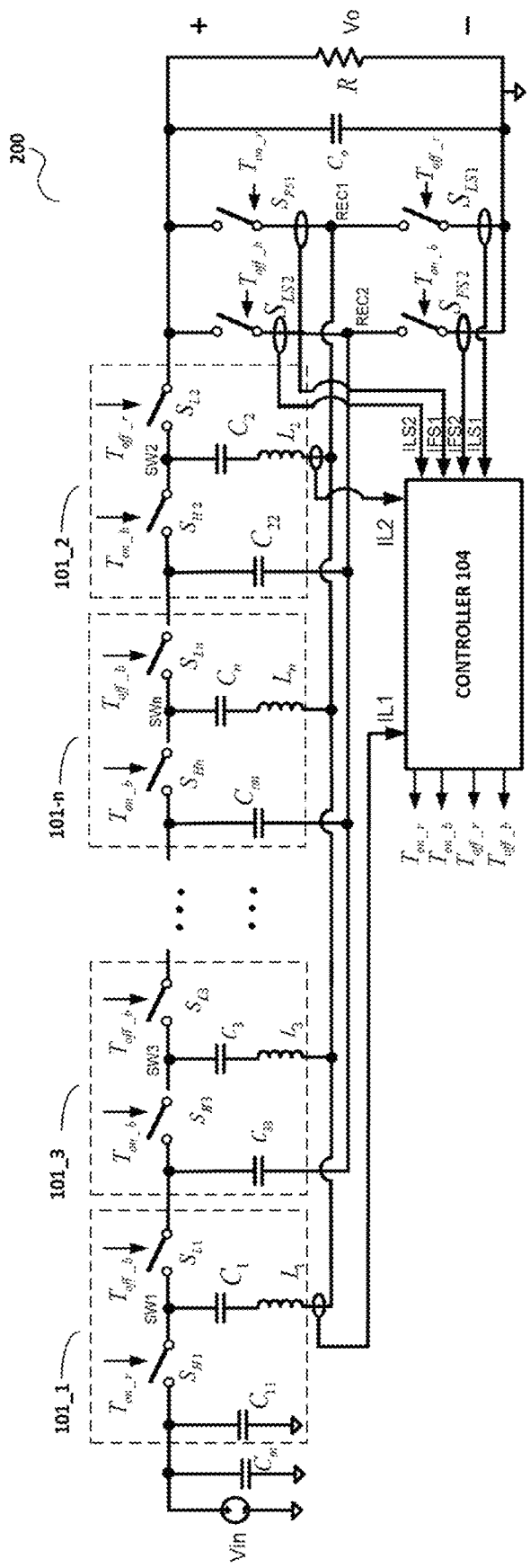
FIG. 8 schematically illustrates a switched tank converter 200 in accordance with an embodiment of the present invention.

In the foregoing embodiments, a switched tank converter with two conversion units and a conversion ratio (Vin/Vo) of 4:1 is taken as an example. People of ordinary skills in the art could understand, however, that the present invention is also applicable to other structures. FIG. 8 schematically illustrates a switched tank converter 200 in accordance with an embodiment of the present invention. Compared to the embodiment shown in FIG. 2A, the converter of FIG. 8 further incorporates other conversion units 101_3~101_n coupled between the first conversion unit 101_1 and the second conversion unit 101_2. These conversion units also have the internal structure as shown in FIG. 2B, and their high side switches and low side switches are respectively controlled by signals Ton_b and Toff_b.

Figure 9:
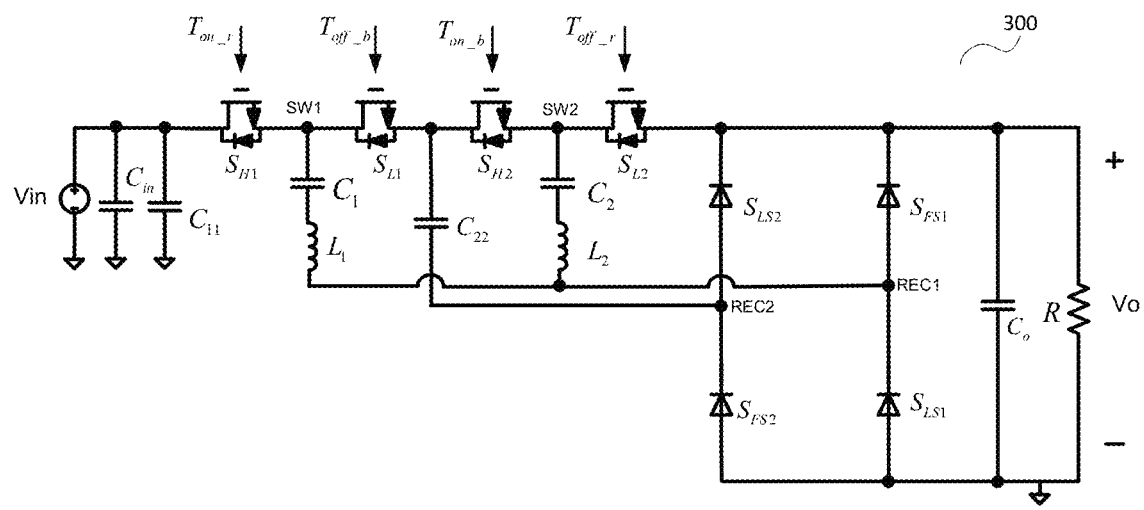
FIG. 9 schematically illustrates a switched tank converter 300 in accordance with an embodiment of the present invention.

Furthermore, people of ordinary skills in the art could recognize that, besides controllable switches such as MOSFETs, the rectifier switches in the rectifier unit could also be uncontrollable ones, such as diodes shown in FIG. 9. Additionally, in some embodiments, the capacitor Cin could be omitted, or combined with the capacitor C11. And the capacitor C11 is not necessarily coupled to the reference ground, but could be coupled to other suitable nodes.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A control method used in a switched tank converter, wherein the switched tank converter comprises a first conversion unit, a second conversion unit and a rectification unit, each of the conversion units has a first terminal, a second terminal, a third terminal, a fourth terminal and a switch node, and includes a clamp capacitor coupled between the first and third terminals, a high side switch coupled between the first terminal and the switch node, a low side switch coupled between the switch node and the second terminal, and a resonant tank coupled between the switch node and the fourth terminal; the first terminal of the second conversion unit is coupled to the second terminal of the first conversion unit; the rectification unit includes a first rectification switch, a second rectification switch, a third rectification switch and a fourth rectification switch, each of the rectification switches has a first terminal and a second terminal, the first terminals of the first and fourth rectification switches are coupled to the second terminal of the second conversion unit, the second terminals of the second and third rectification switches are coupled together, the second terminal of the first rectification switch and the first terminal of the third rectification switch are coupled to the fourth terminals of the first and second conversion units, the second terminal of the fourth rectification switch and the first terminal of the second rectification switch are coupled to the third terminal of the second conversion unit; the control method comprises:
- based on current flowing through the resonant tanks in the first and second conversion units, determining when to turn on the high side switches of the first and second conversion units, and when to turn on the low side switches of the first and second conversion units;
- detecting whether current flowing through the first, second, third and fourth rectification switches crosses zero; and
- based on the detection result, respectively determining when to turn off the high side switch of the first conversion unit, when to turn off the high side switch of the second conversion unit, when to turn off the low side switch of the second conversion unit, and when to turn off the low side switch of the first conversion unit.

2. The control method of claim 1, wherein the first, second, third and fourth rectification switches are all controllable switches.

3. The control method of claim 1, further comprising:
turning on the high side switches of the first and second conversion units, when the current flowing through the resonant tanks in the first and second conversion units are equal and are respectively flowing out from the corresponding switch node;
turning off the high side switch of the second conversion unit, when a zero cross of the current flowing through the second rectification switch is detected;
turning off the high side switch of the first conversion unit, when a zero cross of the current flowing through the first rectification switch is detected;
turning on the low side switches of the first and second conversion units, when the current flowing through the resonant tanks in the first and second conversion units are equal and are respectively flowing into the corresponding switch node;
turning off the low side switch of the first conversion unit, when a zero cross of the current flowing through the fourth rectification switch is detected; and
turning off the low side switch of the second conversion unit, when a zero cross of the current flowing through the third rectification switch is detected.

4. The control method of claim 1, further comprising:
turning on the high side switches of the first and second conversion units, when the current flowing through the resonant tanks in the first and second conversion units are detected to have both finished zero cross and changed their direction to flowing out from the corresponding switch node;
turning off the high side switch of the second conversion unit, when a zero cross of the current flowing through the second rectification switch is detected;
turning off the high side switch of the first conversion unit, when a zero cross of the current flowing through the first rectification switch is detected;
turning on the low side switches of the first and second conversion units, when the current flowing through the resonant tanks in the first and second conversion units are detected to have both finished zero cross and changed their direction to flowing into the corresponding switch node;
turning off the low side switch of the first conversion unit, when a zero cross of the current flowing through the fourth rectification switch is detected; and
turning off the low side switch of the second conversion unit, when a zero cross of the current flowing through the third rectification switch is detected.

5. A controller used in a switched tank converter, wherein the switched tank converter having a first conversion unit, a second conversion unit and a rectification unit, each of the conversion units has a first terminal, a second terminal, a third terminal, a fourth terminal and a switch node, and includes a clamp capacitor coupled between the first and third terminals, a high side switch coupled between the first terminal and the switch node, a low side switch coupled between the switch node and the second terminal, and a resonant tank coupled between the switch node and the fourth terminal; the first terminal of the second conversion unit is coupled to the second terminal of the first conversion unit; the rectification unit includes a first rectification switch, a second rectification switch, a third rectification switch and a fourth rectification switch, each of the rectification switches has a first terminal and a second terminal, the first terminals of the first and fourth rectification switches are coupled to the second terminal of the second conversion unit, the second terminals of the second and third rectification switches are coupled together, the second terminal of the first rectification switch and the first terminal of the third rectification switch are coupled to the fourth terminals of the first and second conversion units, the second terminal of the fourth rectification switch and the first terminal of the second rectification switch are coupled to the third terminal of the second conversion unit, the controller comprising:
a turnon determination circuit configured to detect current flowing through the resonant tanks in the first and second conversion units;
a first zero cross detection circuit configured to detect whether the current flowing through the first rectification switch crosses zero;
a second zero cross detection circuit configured to detect whether the current flowing through the second rectification switch crosses zero;

a third zero cross detection circuit configured to detect whether the current flowing through the third rectification switch crosses zero; and a fourth zero cross detection circuit configured to detect whether the current flowing through the fourth rectification switch crosses zero;

and wherein:

based on the current flowing through the resonant tanks in the first and second conversion units, the controller determines when to turn on the high side switches of the first and second conversion units, and when to turn on the low side switches of the first and second conversion units;

based on the detection results of the first, second, third and fourth zero cross detection circuits, the controller respectively determines when to turn off the high side switch of the first conversion unit, when to turn off the high side switch of the second conversion unit, when to turn off the low side switch of the second conversion unit, and when to turn off the low side switch of the first conversion unit.

6. The controller of claim 5, wherein the first, second, third and fourth rectification switches are all controllable switches.

7. The controller of claim 5, wherein:

the high side switches of the first and second conversion units are turned on, when the current flowing through the resonant tanks in the first and second conversion units are equal and are respectively flowing out from the corresponding switch node;

the high side switch of the second conversion unit is turned off, when a zero cross of the current flowing through the second rectification switch is detected;

the high side switch of the first conversion unit is turned off, when a zero cross of the current flowing through the first rectification switch is detected;

the low side switches of the first and second conversion units are turned on, when the current flowing through the resonant tanks in the first and second conversion units are equal and are respectively flowing into the corresponding switch node;

the low side switch of the first conversion unit is turned off, when a zero cross of the current flowing through the fourth rectification switch is detected; and the low side switch of the second conversion unit is turned off, when a zero cross of the current flowing through the third rectification switch is detected.

8. The controller of claim 5, wherein:

the high side switches of the first and second conversion units are turned on, when the current flowing through the resonant tanks in the first and second conversion units are detected to have both finished zero cross and changed their direction to flowing out from the corresponding switch node;

the high side switch of the second conversion unit is turned off, when a zero cross of the current flowing through the second rectification switch is detected;

the high side switch of the first conversion unit is turned off, when a zero cross of the current flowing through the first rectification switch is detected;

the low side switches of the first and second conversion units are turned on, when the current flowing through the resonant tanks in the first and second conversion units are detected to have both finished zero cross and changed their direction to flowing into the corresponding switch node;

the low side switch of the first conversion unit is turned off, when a zero cross of the current flowing through the fourth rectification switch is detected; and the low side switch of the second conversion unit is turned off, when a zero cross of the current flowing through the third rectification switch is detected.

9. The controller of claim 5, further comprising:

a first logic circuit coupled to the turnon determination circuit and the first zero cross detection circuit, wherein based on a first turn on control signal generated by the turnon determination circuit and a first zero cross detection signal generated by the first zero cross detection circuit, the first logic circuit generates a first control signal to control the high side switch of the first conversion unit;

a second logic circuit coupled to the turnon determination circuit and the second zero cross detection circuit, wherein based on the first turn on control signal and a second zero cross detection signal generated by the second zero cross detection circuit, the second logic circuit generates a second control signal to control the high side switch of the second conversion unit;

a third logic circuit coupled to the turnon determination circuit and the third zero cross detection circuit, wherein based on a second turn on control signal generated by the turnon determination circuit and a third zero cross detection signal generated by the third zero cross detection circuit, the third logic circuit generates a third control signal to control the low side switch of the second conversion unit; and a fourth logic circuit coupled to the turnon determination circuit and the fourth zero cross detection circuit, wherein based on the second turn on control signal and a fourth zero cross detection signal generated by the fourth zero cross detection circuit, the fourth logic circuit generates a fourth control signal to control the low side switch of the first conversion unit.

10. The controller of claim 5, wherein the switched resonant converter further comprises a third conversion unit having a first terminal, a second terminal, a third terminal and a fourth terminal, the first terminal of the third conversion unit is coupled to the second terminal of the first conversion unit, the second terminal of the third conversion unit is coupled to the first terminal of the second conversion unit, the third terminal of the third conversion unit is coupled to the third terminal of the second conversion unit, the fourth terminal of the third conversion unit is coupled to the fourth terminal of the second conversion unit.

11. A switched tank converter comprising:

a first conversion unit and a second conversion unit, wherein each of the conversion units has a first terminal, a second terminal, a third terminal, a fourth terminal and a switch node, and includes a clamp capacitor coupled between the first and third terminals, a high side switch coupled between the first terminal and the switch node, a low side switch coupled between the switch node and the second terminal, and a resonant tank coupled between the switch node and the fourth terminal, and wherein the first terminal of the second conversion unit is coupled to the second terminal of the first conversion unit;

a rectification unit including a first rectification switch, a second rectification switch, a third rectification switch and a fourth rectification switch, wherein each of the rectification switches has a first terminal and a second terminal, and wherein the first terminals of the first and fourth rectification switches are coupled to the second terminal of the second conversion unit, the second terminals of the second and third rectification switches are coupled together, the second terminal of the first rectification switch and the first terminal of the third rectification switch are coupled to the fourth terminals of the first and second conversion units, the second terminal of the fourth rectification switch and the first terminal of the second rectification switch are coupled to the third terminal of the second conversion unit; and a controller configured to control the high side and low side switches of the first and second conversion units, wherein based on current flowing through the resonant tanks in the first and second conversion units, the controller determines when to turn on the high side switches of the first and second conversion units, and when to turn on the low side switches of the first and second conversion units;

the controller further detects whether current flowing through the first, second, third and fourth rectification switches crosses zero; and based on the detection result, the controller respectively determines when to turn off the high side switch of the first conversion unit, when to turn off the high side switch of the second conversion unit, when to turn off the low side switch of the second conversion unit, and when to turn off the low side switch of the first conversion unit.

12. The switched tank converter of claim 11, wherein the first, second, third and fourth rectification switches are all controllable switches.

13. The switched tank converter of claim 11, wherein:
the high side switches of the first and second conversion units are turned on, when the current flowing through the resonant tanks in the first and second conversion units are equal and are respectively flowing out from the corresponding switch node;
the high side switch of the second conversion unit is turned off, when a zero cross of the current flowing through the second rectification switch is detected;
the high side switch of the first conversion unit is turned off, when a zero cross of the current flowing through the first rectification switch is detected;
the low side switches of the first and second conversion units are turned on, when the current flowing through the resonant tanks in the first and second conversion units are equal and are respectively flowing into the corresponding switch node;
the low side switch of the first conversion unit is turned off, when a zero cross of the current flowing through the fourth rectification switch is detected; and
the low side switch of the second conversion unit is turned off, when a zero cross of the current flowing through the third rectification switch is detected.

14. The switched tank converter of claim 11, wherein:
the high side switches of the first and second conversion units are turned on, when the current flowing through the resonant tanks in the first and second conversion units are detected to have both finished zero cross and changed their direction to flowing out from the corresponding switch node;
the high side switch of the second conversion unit is turned off, when a zero cross of the current flowing through the second rectification switch is detected;
the high side switch of the first conversion unit is turned off, when a zero cross of the current flowing through the first rectification switch is detected;
the low side switches of the first and second conversion units are turned on, when the current flowing through the resonant tanks in the first and second conversion units are detected to have both finished zero cross and changed their direction to flowing into the corresponding switch node;
the low side switch of the first conversion unit is turned off, when a zero cross of the current flowing through the fourth rectification switch is detected; and
the low side switch of the second conversion unit is turned off, when a zero cross of the current flowing through the third rectification switch is detected.

15. The switched tank converter of claim 11, wherein the controller comprises:
a turnon determination circuit, configured to detect the current flowing through the resonant tanks in the first and second conversion units, and generate a first turnon control signal and a second turnon control signal;
a first zero cross detection circuit, configured to detect whether the current flowing through the first rectification switch crosses zero and generate a first zero cross detection signal;
a second zero cross detection circuit, configured to detect whether the current flowing through the second rectification switch crosses zero and generate a second zero cross detection signal;
a third zero cross detection circuit, configured to detect whether the current flowing through the third rectification switch crosses zero and generate a third zero cross detection signal;
a fourth zero cross detection circuit, configured to detect whether the current flowing through the fourth rectification switch crosses zero and generate a fourth zero cross detection signal;
a first logic circuit coupled to the turnon determination circuit and the first zero cross detection circuit, wherein based on the first turn on control signal and the first zero cross detection signal, the first logic circuit generates a first control signal to control the high side switch of the first conversion unit;
a second logic circuit coupled to the turnon determination circuit and the second zero cross detection circuit, wherein based on the first turn on control signal and the second zero cross detection signal, the second logic circuit generates a second control signal to control the high side switch of the second conversion unit;
a third logic circuit coupled to the turnon determination circuit and the third zero cross detection circuit, wherein based on the second turn on control signal and the third zero cross detection signal, the third logic circuit generates a third control signal to control the low side switch of the second conversion unit; and
a fourth logic circuit coupled to the turnon determination circuit and the fourth zero cross detection circuit, wherein based on the second turn on control signal and the fourth zero cross detection signal, the fourth logic circuit generates a fourth control signal to control the low side switch of the first conversion unit.

16. The switched tank converter of claim 11, further comprising a third conversion unit having a first terminal, a second terminal, a third terminal and a fourth terminal, the first terminal of the third conversion unit is coupled to the second terminal of the first conversion unit, the second terminal of the third conversion unit is coupled to the first terminal of the second conversion unit, the third terminal of the third conversion unit is coupled to the third terminal of the second conversion unit, the fourth terminal of the third conversion unit is coupled to the fourth terminal of the second conversion unit.

* * * * *